(12) United States Patent
Kameta

(10) Patent No.: US 9,334,911 B2
(45) Date of Patent: May 10, 2016

(54) SERVO CONTROLLER HAVING FUNCTION FOR REDUCING DROPPING WHEN BRAKING

(71) Applicant: FANUC Corporation, Yamanashi (JP)

(72) Inventor: Kouki Kameta, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/549,166

(22) Filed: Nov. 20, 2014

(65) Prior Publication Data

US 2015/0145465 A1    May 28, 2015

(30) Foreign Application Priority Data

Nov. 26, 2013  (JP) ................................. 2013-243939

(51) Int. Cl.
*G05B 5/01* (2006.01)
*F16D 65/14* (2006.01)
*F16D 65/18* (2006.01)
*F16D 121/24* (2012.01)
*F16D 69/00* (2006.01)

(52) U.S. Cl.
CPC ............. *F16D 65/14* (2013.01); *F16D 65/18* (2013.01); *F16D 2069/004* (2013.01); *F16D 2121/24* (2013.01)

(58) Field of Classification Search
CPC ........... F16D 65/14; F16D 65/18; G05B 5/00; G05B 5/01; F16F 15/02
USPC ......... 318/611, 448, 612, 371, 372, 614, 615, 318/569, 568.11; 188/156, 365; 700/170
See application file for complete search history.

(56) References Cited

U.S. PATENT DOCUMENTS

| | | | | | |
|---|---|---|---|---|---|
| 4,928,047 A | * | 5/1990 | Arai | ....................... | B25J 9/042 188/366 |
| 5,144,213 A | * | 9/1992 | Sasaki | ................ | G05B 19/4147 318/569 |
| 5,153,490 A | * | 10/1992 | Ueta | ...................... | G05B 19/19 318/570 |
| 5,155,423 A | * | 10/1992 | Karlen | ....................... | B25J 9/04 318/568.1 |
| 5,767,645 A | * | 6/1998 | Park | ..................... | G05B 19/404 318/280 |
| 5,889,375 A | * | 3/1999 | Del Rio | .................. | F16D 11/16 318/432 |
| 5,910,090 A | * | 6/1999 | Taute | .................... | B65B 59/005 493/478 |

(Continued)

FOREIGN PATENT DOCUMENTS

| | | |
|---|---|---|
| CN | 1945471 A | 4/2007 |
| CN | 101023281 A | 8/2007 |

(Continued)

*Primary Examiner* — Rita Leykin
(74) *Attorney, Agent, or Firm* — Hauptman Ham, LLP

(57) ABSTRACT

A servo controller having a function for reducing an amount of dropping of a gravity axis provided with a machine. The Servo controller is configured to control a servomotor for driving a gravity axis of the machine, and includes a brake signal outputting part configured to output a brake activation signal and a brake release signal to a mechanical brake for holding the gravity axis; a torque command generating part which generates a torque command value for controlling the position of the servomotor; and a torque limiting value generating part which generates a torque limiting value for limiting the torque command value. The torque limiting value generating part continuously reduces the torque limiting value from a first value larger than a torque corresponding to the gravity force to a second value smaller than the torque corresponding to the gravity force, after the brake activation signal is output.

4 Claims, 3 Drawing Sheets

(56) References Cited

U.S. PATENT DOCUMENTS

| | | | | |
|---|---|---|---|---|
| 5,994,864 | A * | 11/1999 | Inoue | B25J 9/1633 318/568.2 |
| 6,970,761 | B2 * | 11/2005 | Kerner | G05B 13/024 188/156 |
| 7,034,491 | B2 * | 4/2006 | Kozai | G05B 19/404 318/570 |
| 7,067,999 | B2 * | 6/2006 | Sugano | E02F 9/128 318/372 |
| 8,019,460 | B2 * | 9/2011 | Akaiwa | G05B 19/4097 318/563 |
| 8,069,714 | B2 * | 12/2011 | Ortmaier | B25J 13/085 73/121 |
| 8,467,942 | B2 * | 6/2013 | Kawaguchi | E02F 9/123 701/50 |
| 2005/0253542 | A1 | 11/2005 | Sugano et al. | |
| 2007/0096670 | A1 | 5/2007 | Hashimoto et al. | |
| 2008/0249691 | A1 | 10/2008 | Kawaguchi et al. | |

FOREIGN PATENT DOCUMENTS

| | | |
|---|---|---|
| CN | 101067304 A | 11/2007 |
| JP | H07-104811 A | 4/1995 |
| JP | H09-254079 A | 9/1997 |
| JP | 2001-344022 A | 12/2001 |
| JP | 2003-131701 A | 5/2003 |
| JP | 2008-204366 A | 9/2008 |
| JP | 2010-215369 A | 9/2010 |

* cited by examiner

SERVO CONTROLLER HAVING FUNCTION FOR REDUCING DROPPING WHEN BRAKING

RELATED APPLICATIONS

The present application claims priority to Japanese Application Number 2013-243939, filed Nov. 26, 2013, the disclosure of which is hereby incorporated by reference herein in its entirety.

BACKGROUND OF THE INVENTION

1. Field of the Invention

The preset invention relates to a servo controller having a function for reducing an amount of dropping of a gravity axis when braking the gravity axis.

2. Description of the Related Art

In a configuration wherein a feed axis, etc., of a machine tool or an industrial machine is driven, in case that an axis driven by a servomotor is subject to external force, in particular gravity force (hereinafter, such an axis is referred to as a "gravity axis"), the gravity axis may fall by gravity when power to the servomotor is shut and the gravity axis is in the uncontrolled state.

As a technique regarding the dropping of a gravity axis, for example, JP 2003-131701 A discloses a controller for a servomotor. The controller is configured to output a command for lifting a gravity axis of a machine driven by a servomotor by a predetermined distance, and output a command for braking the gravity axis by means of a brake device, when the machine is in an emergency stop state or a power outage state.

Further, JP 2010-215369 A discloses a servo control system used in a turning operation machine such as a crane car, wherein a load axis is driven by an electric motor via a plurality of gears. In order to reduce an influence due to a backlash between the gears, the servo control system is configured to limit output torque of the motor during the passage of a predetermined period of time corresponding to time required for movement of one gear by a backlash width, when the motor is reversed or decelerated.

In JP 2003-131701 A, it is described that the object of the invention in this document is to prevent dropping or falling of the gravity axis when the gravity axis is braked. However, in JP 2003-131701 A, when a means for stopping the gravity axis during the braking should be switched from motor control to a mechanical brake, the gravity axis is previously lifted by a distance larger than the amount of dropping before the mechanical brake is activated. Therefore, in JP 2003-131701 A, the amount of dropping of the gravity axis is not decreased.

On the other hand, the object of the invention in JP 2010-215369 A is to prevent vibration, noise and decrease in a machine life due to the backlash, and is not to reduce the amount of dropping of the gravity axis. Further, in JP 2010-215369 A, it is described that the output torque of the motor is limited during the passage of the predetermined period of time corresponding to time required for movement of the second gear by the backlash width. However, this document does not concretely describe as to what value the torque is limited to.

SUMMARY OF THE INVENTION

Therefore, an object of the present invention is to provide a servo controller having a function for reducing an amount of dropping of a gravity axis provided with a machine such as a machine tool or an industrial machine.

According to the present invention, there is provided a servo controller for controlling a servomotor which drives a gravity axis of a machine tool or an industrial machine, the servo controller comprising: a brake signal outputting part configured to output a brake activation signal and a brake release signal to a mechanical brake with a backlash for holding the gravity axis; a torque command generating part which generates a torque command value for controlling a position of the servomotor; and a torque limiting value generating part which generates a torque limiting value for limiting the torque command value generated by the torque command generating part, wherein the torque limiting value generating part continuously reduces the torque limiting value from a first value larger than a torque corresponding to a gravity force to a second value smaller than the torque corresponding to the gravity force, after the brake signal outputting part outputs the brake activation signal.

In a preferred embodiment, the torque limiting value generating part reduces the torque limiting value after waiting until the brake signal outputting part outputs the brake activation signal and then the mechanical brake is activated.

In a preferred embodiment, the second value is equal to zero.

In a preferred embodiment, the first value corresponds to the torque command immediately before the torque limiting value begins to be decreased.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
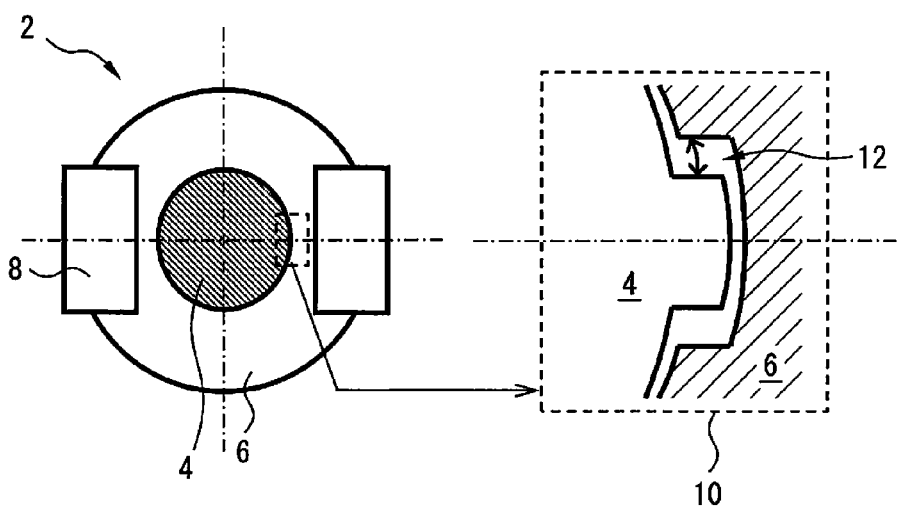
FIG. 1 shows a schematic configuration of a gravity axis and a mechanical brake to which the present invention can be applied.

FIG. 1 is a view showing a schematic configuration of a mechanical brake with a backlash, to which the present invention can be applied. Mechanical brake 2 has a friction plate 6 which is integrally rotatable with an axis (shaft) 4 of a machine tool or an industrial machine, such as a feed axis, etc., driven by a servomotor (not shown); and a brake pad 8 which is movable toward or away from friction plate 6. Since friction plate 6 is sandwiched by brake pad 8, a predetermined holding force is applied to friction plate 6.

On the other hand, shaft 4 and friction plate 6 are engaged to each other, by means of a concave-convex structure, for example, as shown in an enlarged portion enclosed by a dashed line 10. Therefore, when friction plate 6 is stopped, shaft 4 is also stopped. In this regard, structurally, between shaft 4 and friction plate 6 (or in the illustrated concave-convex structure), a certain length of backlash 12 exists. Further, in addition to backlash 12 between shaft 4 and friction plate 6, another backlash may exist between brake pad 8 and a fixture for brake pad 8 (not shown).

Figure 2A:
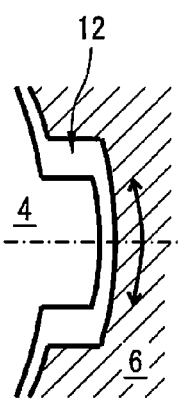
FIGS. 2a to 2d explain the motion of the gravity axis and a friction plate at a backlash portion of the mechanical brake of FIG. 1.
Figure 2B:
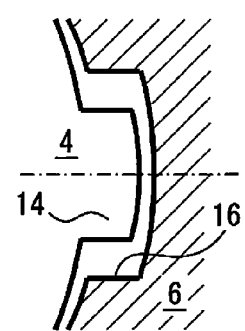
Figure 2C:
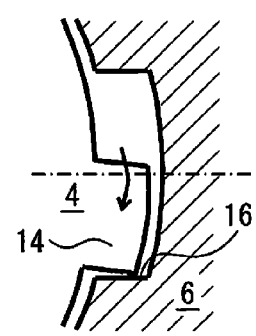
Figure 2D:
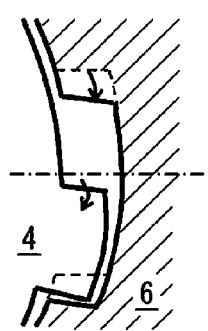
Figure 3:
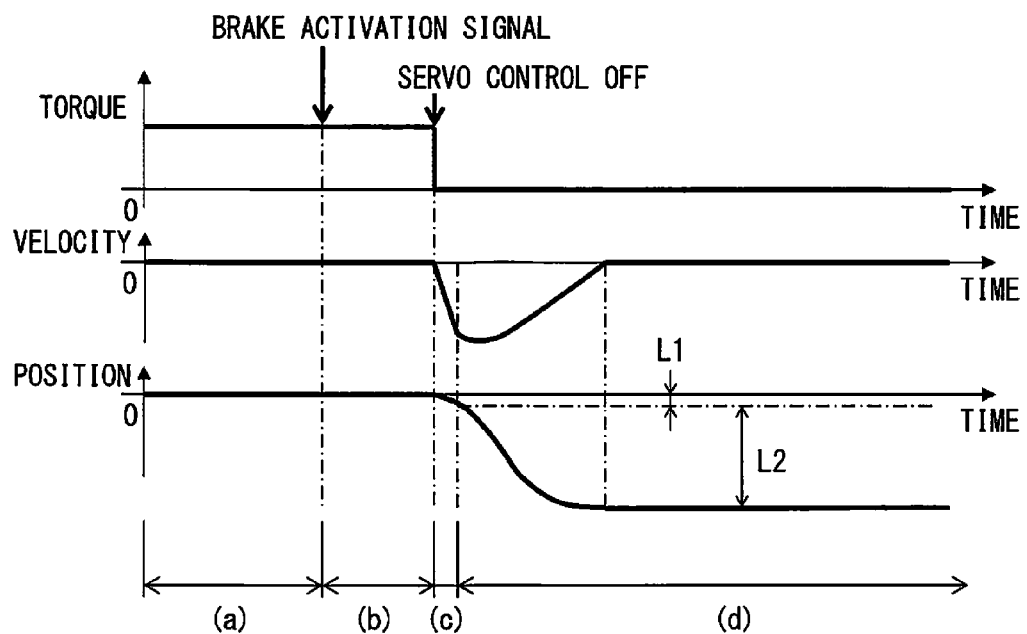
FIG. 3 is a graph showing temporal change in a torque of the servomotor, a velocity and a position of the gravity axis, when a conventional servo controller is used, with respect to the motion as shown in FIGS. 2a to 2d.

FIGS. 2a to 2d explain the conventional motion of shaft 4 and friction plate 6 at a backlash portion of mechanical brake 2 of FIG. 1, and FIG. 3 is a graph showing temporal change in a torque of the servomotor, a velocity and a position of the shaft with respect to the motion as shown in FIGS. 2a to 2d. Shaft 4 is a gravity axis to which the gravity force is applied. During an operation for stopping shaft 4, a stopping operation by using the torque of the servomotor (or by controlling the servomotor) is switched to a stopping operation by using mechanical brake 2. Concretely, first, as shown in FIG. 2a and a section (a) in FIG. 3, when the servomotor for driving shaft 4 is stopped by the servo control, shaft 4 is held at a certain position by the holding torque of the servomotor. On the other hand, friction plate 6 is located at a free position within backlash 12. At this point, when mechanical brake 2 is activated (or brake pad 8 sandwiches friction plate 6), friction plate 6 is locked at the current position (or at the free position within the backlash), as shown in FIG. 2b and a section (b) in FIG. 3.

Next, in order to switch a means for stopping shaft 4 from the servomotor to mechanical brake 2, power to the servomotor is shutoff (or the servo control is turned off), and then, the torque of the servomotor discontinuously becomes zero. Accordingly, shaft 4 is downwardly accelerated within backlash 12 due to the gravity force, whereby shaft 4 drops or falls by a distance (for example, a distance L1 in FIG. 3) which is not more than the width of the backlash, as shown in FIG. 2c and a section (c) in FIG. 3.

In this regard, as exemplified in FIG. 2c, a convex portion 14 of shaft 4 comes into contact with a backlash end portion (or a shoulder portion) 16, whereby friction plate 6 may downwardly slip relative to brake pad 8 (for example, friction plate 6 further falls by a distance L2 in FIG. 3). Accordingly, shaft 4 further falls. Due to such motion, in the prior art, as shown in FIG. 2d and a section (d) in FIG. 3, the gravity axis drops by a relatively long distance when being braked, whereby the accuracy of a machine tool or an industrial machine including the gravity axis may be deteriorated.

Figure 4:
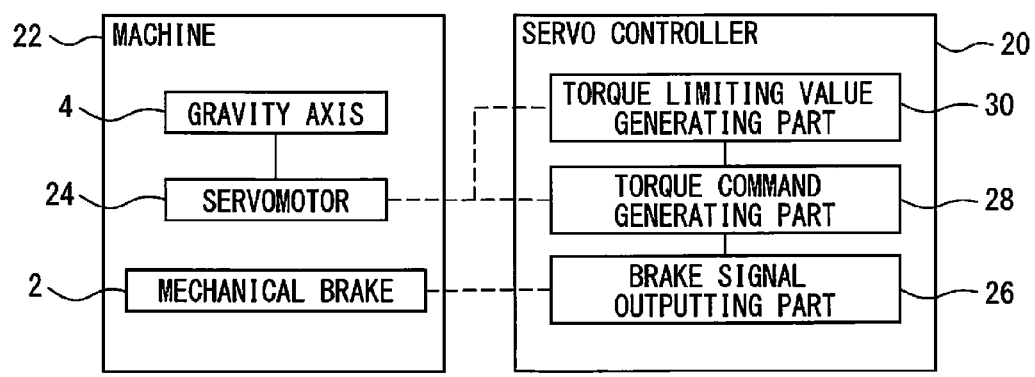
FIG. 4 is a block diagram showing a schematic configuration of a servo controller according to the invention, as well as a schematic configuration of a machine including the gravity axis.

Thus, a servo controller 20 according to the present invention has a configuration as shown in FIG. 4. Servo controller 20 is configured to control a servomotor 24 for driving gravity axis 4, such as a feed axis provided to a machine 22 such as a machine tool or an industrial machine, to which the gravity force is applied. Servo controller 20 includes a brake signal outputting part 26 configured to output a brake activation signal for activating brake 2 and a brake release signal for releasing brake 2 to mechanical brake 2 for holding (stopping) gravity axis 4; a torque command generating part 28 which generates a torque command value for controlling the position of servomotor 24; and a torque limiting value generating part 30 which generates a torque limiting value for limiting the torque command value generated by torque command generating part 28 (i.e., the torque limiting value is an upper limit which the torque command value does not exceed). Torque limiting value generating part 30 continuously reduces the torque limiting value from a first value larger than a torque corresponding to the gravity force (i.e., a torque applied to the gravity axis due to the gravity force) to a second value smaller than the torque corresponding to the gravity force, after brake signal outputting part 26 outputs the brake activation signal.

Next, with reference to FIG. 5 similar to FIG. 3, the function of servo controller 20 of the invention will be explained. As explained using FIGS. 2a to 2d, shaft 4 is the gravity axis to which the gravity force is applied. During an operation for stopping shaft 4, a stopping operation by using the torque of the servomotor (or by controlling the servomotor) is switched to a stopping operation by using mechanical brake 2. Concretely, first, as shown in FIG. 2a and a section (a) in FIG. 5, when servomotor 24 for driving shaft 4 is stopped by the servo control, shaft 4 is held at a certain position by the holding torque of servomotor 24. On the other hand, friction plate 6 is located at a free position within backlash 12. At this point, when mechanical brake 2 is activated (or brake pad 8 sandwiches friction plate 6), friction plate 6 is locked at the current position (or at the free position within the backlash), as shown in FIG. 2b and a section (b) in FIG. 5.

Next, in order to switch a means for stopping shaft 4 from servomotor 24 to mechanical brake 2, in the present invention, without shutting-off power to servomotor 24 (or turning off the servo control), torque limiting value generating part 30 continuously reduces (or monotonically decreases) the torque limiting value for limiting the torque command value of servomotor 24, from a first value larger than a torque corresponding to the gravity force applied to shaft 4 to a second value smaller than the torque corresponding to the gravity force.

Figure 5:
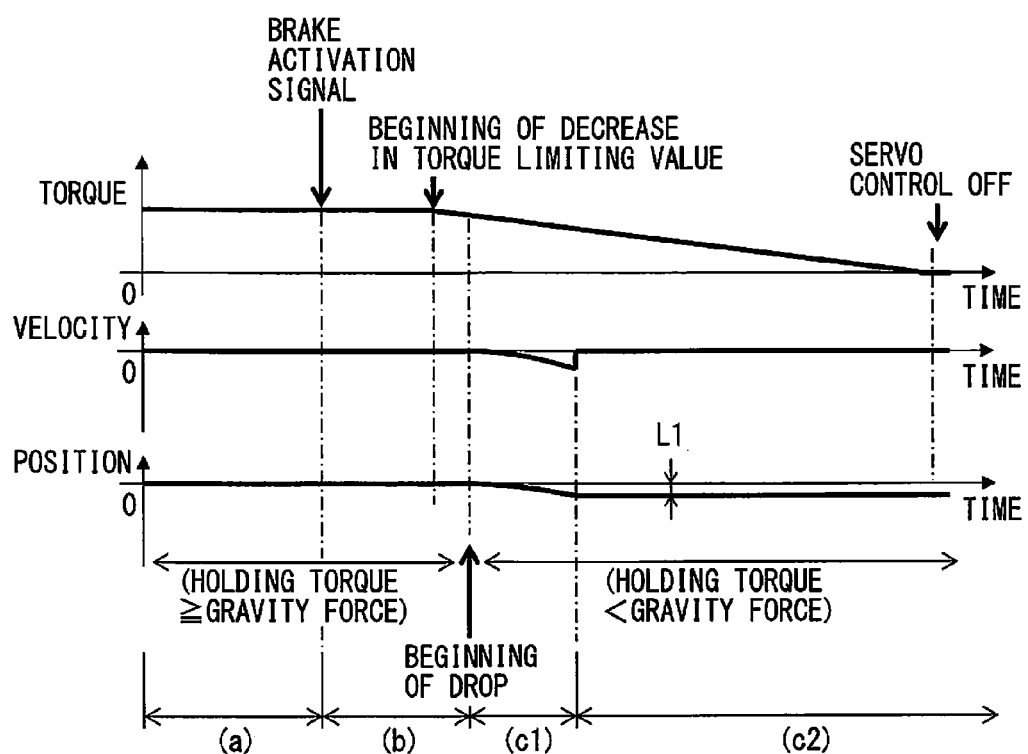
FIG. 5 is a graph showing temporal change in a torque of the servomotor, a velocity and a position of the gravity axis, when the servo controller of the invention is used.

In the example of FIG. 5, the torque corresponding to the first value is equivalent to a torque (or a holding torque) by which shaft 4 does not drop due to the torque corresponding to the gravity force even when brake 2 is not activated. As the torque limiting value is gradually reduced from the first value, shaft 4 starts to drop at the moment when the torque limiting value falls below the torque corresponding to the gravity force (at a point "beginning of drop" in FIG. 5). However, in the present invention, since the torque of servomotor 24 is gradually decreased after that, the drop velocity of shaft 4 is not rapidly decreased unlike the prior art (section (c) in FIG. 3). Therefore, shaft 4 is moved within backlash 12 at relatively low velocity (a section (c1) in FIG. 5).

Therefore, in the present invention, the dropping or slippage of friction plate 6 as shown in FIG. 2d does not occur, and the state as shown in FIG. 2c is maintained. In other words, in the invention, the drop velocity (or acceleration) of shaft 4 is significantly reduced relative to the prior art, and the collision between friction plate 6 and gravity axis 4 does not occur slippage of friction plate 6 relative to brake pad 8. Therefore, the amount of drop of the gravity axis is limited within a distance (L1) corresponding to the backlash width (a section (c2) in FIG. 5). According to the present invention, noise and vibration due to the dropping of the gravity axis during braked are reduced, and an operation accuracy of the machine tool or industrial machine including the gravity axis is improved.

In the present invention, a period of time wherein the torque limiting value is decreased from the first value to the second value (i.e., a period of time from "beginning of decrease in torque limiting value" to "servo control off" in FIG. 5) is not particularly limited, whereas the period of time is preferably between 50 milliseconds and 500 milliseconds.

Preferably, torque limiting value generating part 30 does not limit the torque limiting value immediately after brake signal outputting part 26 outputs the brake activation signal. Instead, as shown in a section (b) in FIG. 5, it is preferable that torque limiting value generating part 30 decrease the torque limiting value after a period of time, from when mechanical brake 2 receives the activation signal to when mechanical brake 2 is actually activated, has passed (i.e., after waiting until brake signal outputting part 26 outputs the brake activation signal and then mechanical brake 2 is activated). By virtue of this, the amount of dropping of the gravity axis can be reduced more assuredly.

As shown in section (c2) in FIG. 5, the second value, smaller than the torque corresponding to the gravity force, may be zero. By virtue of this, the torque of servomotor 24 can be assuredly prevented from being discontinuously varied. In this regard, after the movement (or the dropping) of gravity axis 4 within the backlash is completed (section (c2) in FIG. 5), the servo control may be turned off before the second value is decreased to zero.

Further, the first value may be any value as long as it is larger than the torque corresponding to the gravity force. For example, the first value may be the same as the torque command value immediately before the torque limiting value begins to be decreased (in the example of FIG. 5, the holding torque). By virtue of this, the motion gravity axis 4 can be smoothed.

According to the present invention, by decreasing the drop velocity of the gravity axis when braking the gravity axis, noise and vibration due to the collision between the gravity axis and the mechanical brake are reduced. Further, by reducing the amount of dropping of the gravity axis, the operation accuracy of the machine tool or industrial machine including the gravity axis can be improved.

While the invention has been described with reference to specific embodiments chosen for the purpose of illustration, it should be apparent that numerous modifications could be made thereto, by a person skilled in the art, without departing from the basic concept and scope of the invention.

The invention claimed is:

1. A servo controller for controlling a servomotor which drives a gravity axis of a machine tool or an industrial machine, the servo controller comprising:
   a brake signal outputting part configured to output a brake activation signal and a brake release signal to a mechanical brake with a backlash for holding the gravity axis;
   a torque command generating part which generates a torque command value for controlling a position of the servomotor; and
   a torque limiting value generating part which generates a torque limiting value for limiting the torque command value generated by the torque command generating part,
   wherein the torque limiting value generating part continuously reduces the torque limiting value from a first value larger than a torque corresponding to a gravity force to a second value smaller than the torque corresponding to the gravity force, after the brake signal outputting part outputs the brake activation signal.

2. The servo controller as set forth in claim 1, wherein the torque limiting value generating part reduces the torque limiting value after waiting until the brake signal outputting part outputs the brake activation signal and then the mechanical brake is activated.

3. The servo controller as set forth in claim 1, wherein the second value is equal to zero.

4. The servo controller as set forth in claim 1, wherein the first value corresponds to the torque command immediately before the torque limiting value begins to be decreased.

* * * * *